United States Patent
Gerosa et al.

(10) Patent No.: US 11,388,464 B2
(45) Date of Patent: Jul. 12, 2022

(54) INCREASING VIDEO BIT RATES WHILE MAINTAINING VIDEO QUALITY

(71) Applicant: Microsoft Technology Licensing, LLC, Redmond, WA (US)

(72) Inventors: Riccardo Gerosa, Bellevue, WA (US); Bryan Grounds, Redmond, WA (US); Stefan Francis Slivinski, Mercer Island, WA (US); Quinn Damerell, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 371 days.

(21) Appl. No.: 16/141,653

(22) Filed: Sep. 25, 2018

(65) Prior Publication Data
US 2020/0099972 A1    Mar. 26, 2020

(51) Int. Cl.
*H04N 21/2662* (2011.01)
*H04L 65/80* (2022.01)
(Continued)

(52) U.S. Cl.
CPC ......... *H04N 21/2662* (2013.01); *H04L 65/80* (2013.01); *H04N 21/234* (2013.01);
(Continued)

(58) Field of Classification Search
CPC ............. H04N 21/2662; H04N 21/234; H04N 21/2402; H04N 21/4383; H04N 21/643; H04N 21/6582; H04N 21/44209; H04N 21/8456; H04N 21/23439; H04L 65/80; H04L 65/1069; H04L 65/4069; H04L 65/4092; H04L 65/605; H04L 65/607
See application file for complete search history.

(56) References Cited

U.S. PATENT DOCUMENTS

| | | |
|---|---|---|
| 8,403,757 B2 | 3/2013 | Mizrachi |
| 9,380,097 B2 | 6/2016 | Barak et al. |
| (Continued) | | |

FOREIGN PATENT DOCUMENTS

CN        105338372 A        2/2016

OTHER PUBLICATIONS

Application as Filed in U.S. Appl. No. 15/628,512, filed Jun. 20, 2017, 40 Pages.
(Continued)

*Primary Examiner* — Kunal Langhnoja

(57) ABSTRACT

Systems, methods, and software technology for optimizing the streaming video to end points while maintaining low latency. In an implementation, a streaming service receives video data for distribution to a plurality of end points. For each end point, the service streams the video data at a given bit rate to the end point. While the video is being streamed, the service sends test data to the end point at an additional bit rate. The service also increases the additional bit rate of the test data until a threshold decline in quality of the video data occurs or until a total bit rate of the video data and the test data reaches a next available bit rate for the video data. The service conditionally switches from the given bit rate to the next available bit rate if the total bit rate has reached the next available bit rate.

20 Claims, 9 Drawing Sheets

(51) Int. Cl.
  *H04N 21/234*  (2011.01)
  *H04N 21/24*  (2011.01)
  *H04N 21/438*  (2011.01)
  *H04N 21/643*  (2011.01)

(52) U.S. Cl.
  CPC ..... *H04N 21/2402* (2013.01); *H04N 21/4383* (2013.01); *H04N 21/643* (2013.01)

(56) References Cited

U.S. PATENT DOCUMENTS

| | | | |
|---|---|---|---|
| 10,277,669 B1* | 4/2019 | Joliveau | H04L 65/4084 |
| 2009/0144425 A1* | 6/2009 | Marr | H04L 29/08072 709/226 |
| 2010/0121974 A1* | 5/2010 | Einarsson | H04L 47/25 709/231 |
| 2010/0235542 A1* | 9/2010 | Visharam | H04N 21/23805 709/246 |
| 2014/0351638 A1 | 11/2014 | Chang | |
| 2015/0121437 A1* | 4/2015 | Tan | H04N 21/2187 725/93 |
| 2015/0188962 A1 | 7/2015 | Bulava et al. | |
| 2015/0264096 A1 | 9/2015 | Swaminathan et al. | |
| 2015/0321098 A1 | 11/2015 | van ser laan et al. | |
| 2016/0014437 A1 | 1/2016 | Perlman et al. | |
| 2017/0063702 A1* | 3/2017 | Mani | H04N 21/2335 |

OTHER PUBLICATIONS

Krasic, Charles, "A Framework for Quality-Adaptive Media Streaming: Encode Once—Stream Anywhere", In Dissertation faculty of the OGI School of Science & Engineering, Feb. 2004, 194 Pages.

Pires, et al., "DASH in Twitch: Adaptive Bitrate Streaming in Live Game Streaming Platforms", In Proceedings of the Workshop on Design, Quality and Deployment of Adaptive Video Streaming, Dec. 2, 2014, 7 Pages.

Oueslati, et al., "Network Quality Adaptive Video Transmission", In Proceedings of IEEE International Conference on Computer and Information Technology; Ubiquitous Computing and Communications; Dependable, Autonomic and Secure Computing; Pervasive Intelligence and Computing, Oct. 26, 2015, pp. 469-476.

"International Search Report and Written Opinion Issued in PCT Patent Application No. PCT/US19/039121", dated Aug. 19, 2019, 13 Pages.

* cited by examiner

INCREASING VIDEO BIT RATES WHILE MAINTAINING VIDEO QUALITY

TECHNICAL BACKGROUND

Video streaming services allow users to stream live video to other users in the context of social networks, gaming platforms, enterprise settings, and the like. In some cases, support for two-way communications allows consumers of the video to chat with or otherwise interact with the originator of the content. Latency is therefore an important factor in the enjoyment of such services since low latency allows users to communicate in near real-time, while the inverse may cause too much delay for communicating to be practical Latency is affected by many factors ranging from the bandwidth of the network(s) between a streaming service and its end users to the capacity of the equipment local to an end user. In the absence of addressing any of these factors, the bit rate of the video being streamed can have an impact on latency. In general, increasing the bit rate of the video may increase its latency, while decreasing the bit rate of the video may decrease its latency. However, just as a high bit rate results in high resolution video (which users enjoy), a lower bit rate may result in a lower resolution feed.

A trade-off has therefore existed between providing high resolution video at low latencies. Some streaming technologies are capable of dynamically increasing or decreasing video bit rates in order to maintain latency. For example, HTTP live streaming (HLS) downloads short clips of a video to a client. The client receiving a clip maintains a buffer that gives it time to attempt to download a higher bit rate version of a segment. If successful, the client plays out the higher bit rate video, but if not, it will cancel the download in favor of a lower bit rate segment. Unfortunately, the buffering involved creates too much delay for the purpose of real-time streaming and two-way communications.

Some explicitly real-time services such as voice and video calling services utilize connectionless and unreliable protocols to send and receive data. An example is the user datagram protocol (UDP), which allows a sender to transmit packets to a receiver without regard for whether or in what order the packets arrive at their destination. Such protocols can provide a low latency experience, although jitter and packet loss may occur.

A client receiving video over UDP may provide feedback to the sender to ensure that the playback is smooth. The sending client may then adjust the bit rate up or down to combat any of the ill effects of such streaming. Some of these streamers can send to multiple clients at the same time, which is not scalable beyond a limited number of clients.

Overview

Technology is disclosed herein for optimizing the streaming of video to end points while maintaining low latency. In an implementation, a streaming service receives video data for distribution to a plurality of end points. For each end point, the service streams the video data at a given bit rate to the end point. While the video is being streamed, the service sends test data to the end point at an additional bit rate. The service also increases the additional bit rate of the test data until a threshold decline in quality of the video data occurs or until a total bit rate of the video data and the test data reaches a next available bit rate for the video data. The service conditionally switches from streaming the video data at the given bit rate to streaming the video at the next available bit rate if the total bit rate has reached the next available bit rate. In this manner, the bit rate of the video may be safely increased without jeopardizing a low-latency experience.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
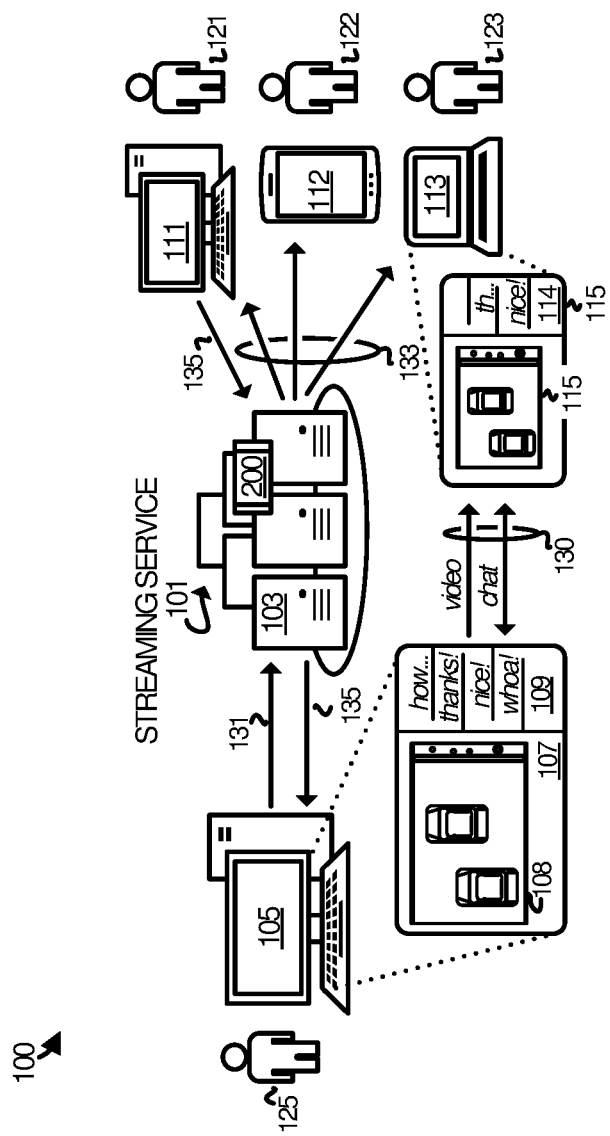
FIG. 1 illustrates an operational environment in an implementation.

Technology is disclosed herein to enhance video streaming. In various implementations, a streaming service receives video data to be streamed to multiple end points. The service encodes the video at different bit rates such that it may switch between the streams as-needed to provide an optimal streaming experience. However, to ascertain whether a particular bit rate is supported, the service first sends test data to a given end point while also streaming video to the end point at an initial bit rate.

As the video is streamed, the service incrementally increases the test data until a point at which the bit rate of the test data and the bit rate of the original stream meet or exceed the next available bit rate of the other versions of the video. If the quality of the original stream has not degraded at this point (or has not degraded too much), the streaming service switches to the video stream that was encoded at the next available bit rate. If the quality has declined a threshold amount while the test data was being increased, then the service maintains the present bit rate at which the video is streamed.

The quality of the streaming may be evaluated using one or more of a number of metrics, such as latency, packet loss, and jitter. An element within the streaming service may make such a determination, e.g. an edge server or the like, based on metrics fed back to it by a client on the receiving end of the video stream. However, the quality of the streaming may also be evaluated by the client application. The client may thus report to the service that the quality has been maintained or degraded or, optionally, the client may even request the higher bit rate stream (assuming the quality was sufficient as the test data was increased).

A decrease in the bit rate of the video is also possible. The streaming service may switch to a version of the video encoded at a lesser bit rate if, for example, network conditions (latency, bit rate, jitter, etc.) indicate a decline in quality irrespective of any test data. That is, the quality of the streaming may decline even without any test data being set. The service may responsively switch to one of the versions of the video that has been encoded at a lesser bit rate than the present version being sent.

In some implementations, the streaming service need only encode the video at the various bit rates once. Then, different versions of the video at the different bit rates are distributed within the service to the servers that ultimately transmit the video to end points. In this manner, the servers responsible for sending the video to the end points need not be burdened with the processing overhead required to encode the video at the various bit rates.

Various technical effects may be appreciated from the foregoing and following discussion, including the ability to increase video bit rates while mitigating detrimental effects on latency. This may be especially beneficial in the context of experiences that are sensitive to delay, such as "live" gaming experiences with two-way interaction between a gamer and his or her fans. In another example, a user may wish to transmit video to many users via a social network. In both cases, low latency allows users to communicate bi-directionally in a real-time or near real-time fashion while still enjoying the benefits of a high-resolution video stream.

Figure 9:
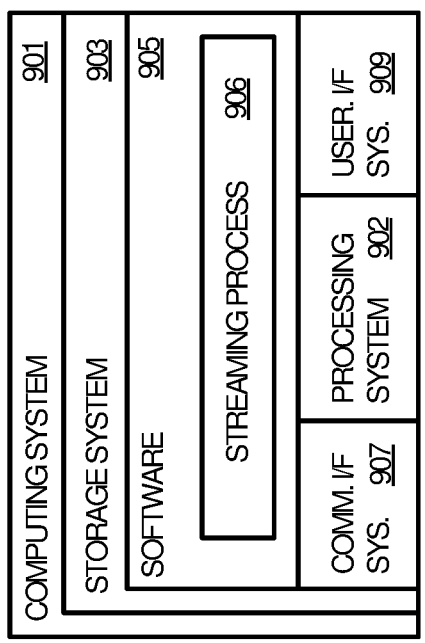
FIG. 9 illustrates a computing system suitable for implementing the number provisioning technology disclosed herein, including any of the architectures, environments, elements, processes, and operational scenarios and sequences illustrated in the Figures and discussed below in the Technical Disclosure.

FIG. 1 illustrates operational environment 100 in an implementation. Operational environment 100 includes streaming service 101 and end points 105, 111, 112, and 113. Streaming service 101 may be implemented in one or more data centers (physical or virtual), represented by data center 103, and on one or more computing systems, of which computing system 901 in FIG. 9 is representative.

Streaming service 101 receives video (and optionally other content) from one or more end points and transmits the video (and optionally other content) to one or more other end points for user consumption. End point 105 is representative of the various computing devices that may stream video to streaming service 101, while end points 111, 112, and 113 are representative of the computing devices to which streaming service 101 may stream video data. Examples include, but are not limited to, laptop and desktop computers, tablets, mobile phones, wearable devices, entertainment devices, gaming consoles, other server computers, Internet of Things (IoT) devices, or any other type of device. Streaming service 101 communicates with end points 105, 111, 112, and 113 over one or more communication networks (e.g. the Internet), combination of networks, or variations thereof.

Figure 2:
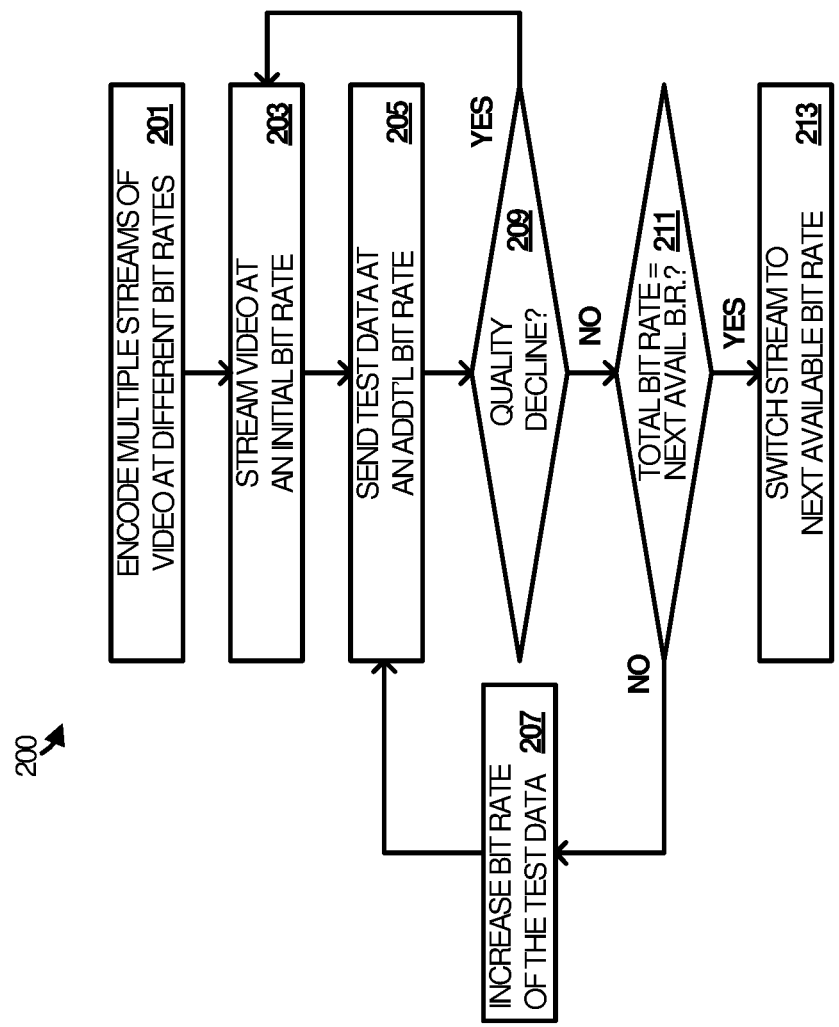
FIG. 2 illustrates a streaming process an implementation.

Streaming service 101 employs a streaming process 200 when receiving, encoding, sending, and switching between video streams. Referring to FIG. 2, streaming process 200 may be implemented in program instructions in the context of any of the software applications, modules, components, or other such programming elements deployed in the various elements of streaming service 101, such servers, switches, and routers. The program instructions direct the underlying physical or virtual computing system or systems to operate as follows, referring parenthetically to the steps in FIG. 2 in the context of operational environment 100 in FIG. 1.

To begin, end point 105 transmits video data 131 to streaming service 101. Streaming service 101 receives the video stream and encodes the video data in multiple streams, each at a different bit rate (step 201). That is, one video feed is received at a given bit rate from end point 105 and is decoded to extract the video data being streamed. The video data is then re-encoded multiple times to produce multiple versions of the original video stream. Each of the multiple versions is encoded at a different bit rate relative to each other of the multiple versions of the video stream.

Next, streaming service 101 sends one or more of the video streams to end point 111, end point 112, and end point 113 (step 203). The one or more video streams are sent via a connectionless and unreliable transport protocol such as UDP, a custom or proprietary protocol, or the like.

From the perspective of a given end point, only one stream is sent to the end point, although the same stream may be sent to more than one of the end points. End points 111, 112, and 113 receive the video streams and play them out for users 121, 122, and 123 respectively. The end users may optionally desire to chat with or otherwise engage with user 125. Accordingly, return content 135 may be sent to streaming service 101 to be forwarded to end point 105, although it may bypass streaming service 101 entirely. This may occur in the context of, for example, a gaming session hosted by user 125 that is "broadcast" from end point 105 to other participating end points, e.g. end points 111, 112, and 113.

Each stream that is sent to a given end point is streamed at an initial bit rate (step 203) from streaming service 101 to the end point. This may be the same bit rate at which the video is received from end point 105. However, it may also be a different one of the other encoded streams—and thus— one of the other bit rates. The video is streamed to the end points and each end point decodes and plays-out the video.

For a given video stream and end point, streaming service 101 proceeds to send test data at an additional bit rate to the end point at substantially the same time as the video stream (step 205). The test data may be "noise" that may be ignored and discarded by the end point. In some cases, the test data may be a duplicate of the video stream, which may even increase the robustness of the transmission if some of the packets of the video stream are lost. In some implementations, the duplicate data may be sent with a flag set to indicate that it is a duplicate of the video stream. The flag may be set in a header portion of the packets that comprise the video stream, for instance. Such a flag or other such indication may allow the client playing back the video to discard or otherwise ignore duplicates.

Streaming service 101 monitors the quality of the video stream while (or after) the test data is being sent to ascertain whether a higher bandwidth version of the video could be supported. The service ascertains whether a threshold decline in quality has occurred in response to the test data (step 209). The threshold decline may be defined in terms of one or more quality metrics, such as an increase in latency, an increase in packet loss, an increase in jitter, or the like. Streaming service 101 may obtain such metrics from clients on the end points that track and report the metrics. In some implementations, the clients monitor for the threshold decline in quality and report the decline to streaming service 101, rather than (or in addition to) reporting the individual metrics.

If a threshold quality decline has occurred, then streaming service 101 determines to continue streaming the video at its present bit rate. The service may optionally continue to test the bandwidth, but may also cease with the additional data, at least for a period of time. However, if the quality of the video stream has not suffered a threshold decline, then the streaming service 101 determines if the total bit rate (the sum of the additional bit rate and the present bit rate) equals, exceeds, or otherwise nears the next available bit rate at which the video data has been encoded (step 211). For instance, assume that the video has been encoded at 1 mb/s, 3 mb/s, and 5 mb/s, and is presently being streamed at 1 mb/s. In this case, streaming service 101 would determine whether the sum of the test data and the present bit rate (1 mb/s) meets, exceeds, or is otherwise close to 3 mb/s.

If so, then streaming service 101 switches the stream to the video data encoded at the next available bit rate (step 213). However, if there remains room between the present bit rate and the next available bit rate, then streaming service increases the bit rate of the test data (step 207) and continues to evaluate the quality of the stream. The bit rate of the test data may thus be incrementally increased up until a point that the quality declines precipitously or the next available bit rate is reached, at which point the stream may be switched to the stream encoded at next available bit rate.

Figure 3:
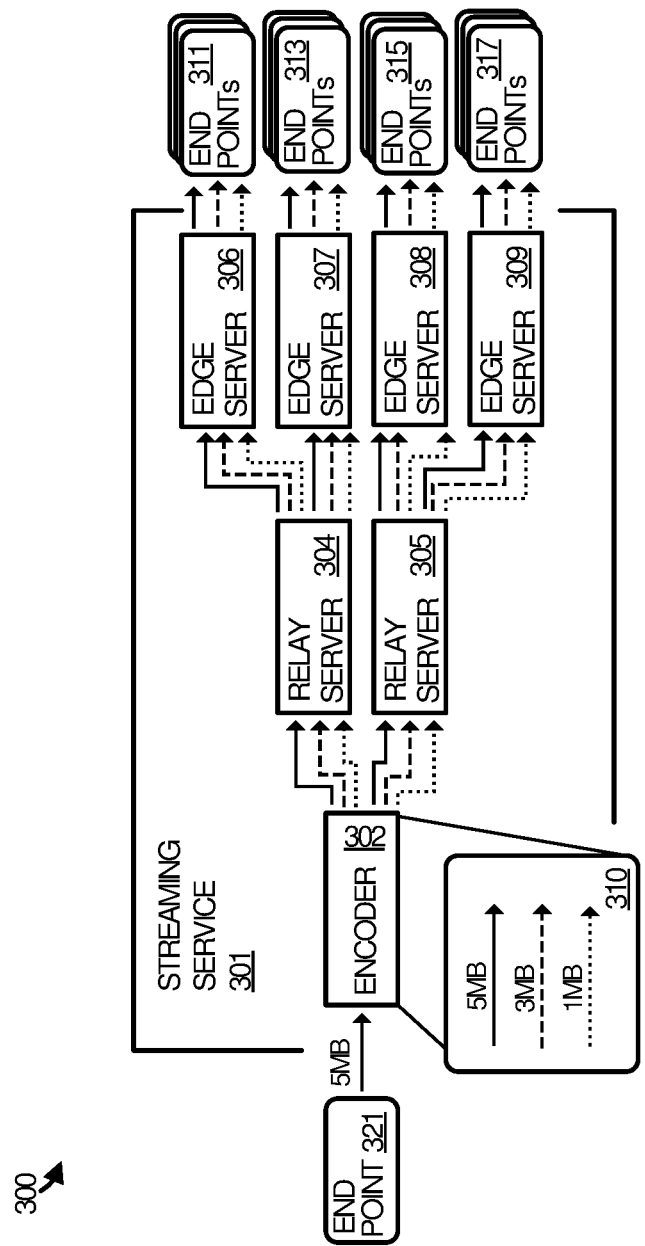
FIG. 3 illustrates an operational environment in an implementation.

FIG. 3 illustrates operational environment 300 in another implementation. Operational environment 300 includes streaming service 301, which provides video streaming services to end points in the context of gaming sessions, social network activity, video conferences, and the like. In general, an end point sends a video stream to streaming service 301, which is then decoded and encoded into multiple video streams having different bit rates. Streaming service 301 sends the various video streams to the end points and switches between lower and higher bit rates when doing so to optimize the user experience.

More particularly, streaming service 301 includes various elements that function together to provide streaming services to end points. Encoder 302 receives video streams from end points, decodes them, and re-encodes them into multiple streams having different bit rates relative to each other. Relay servers 304 and 305 each receive copies of the streams and send them to edge servers 306, 307, 308, and 309. In this implementation, edge server 306 sends video traffic to end points 311; edge server 307 sends video traffic to end points 313; edge serer 308 sends video traffic to end points 317; and edge server 309 sends traffic to end points 317.

Each edge server implements a streaming process (e.g. streaming process 200) that governs which of the multiple streams is sent to any one end point. The streaming process may be implemented in program instructions in the context of any of the software applications, modules, components, or other such programming elements deployed in the various elements of each edge server, of which computing system 901 in FIG. 9 is representative.

As shown, each edge server receives multiple versions of the video to be streamed, each encoded at different bit rates relative to each other as indicated by legend 310. One version at a time is then streamed to any individual end point. Test data is also transmitted to the end point, allowing the edge server to ascertain whether a higher bit rate version of the video stream could be supported. If so, the edge server switches to the higher bit rate version, but if not, the edge server continues to stream at the present bit rate. In some cases, the edge server may step down the bit rate if the quality of the streaming drops, which may occur separately and independent from sending the test data.

Figure 4:
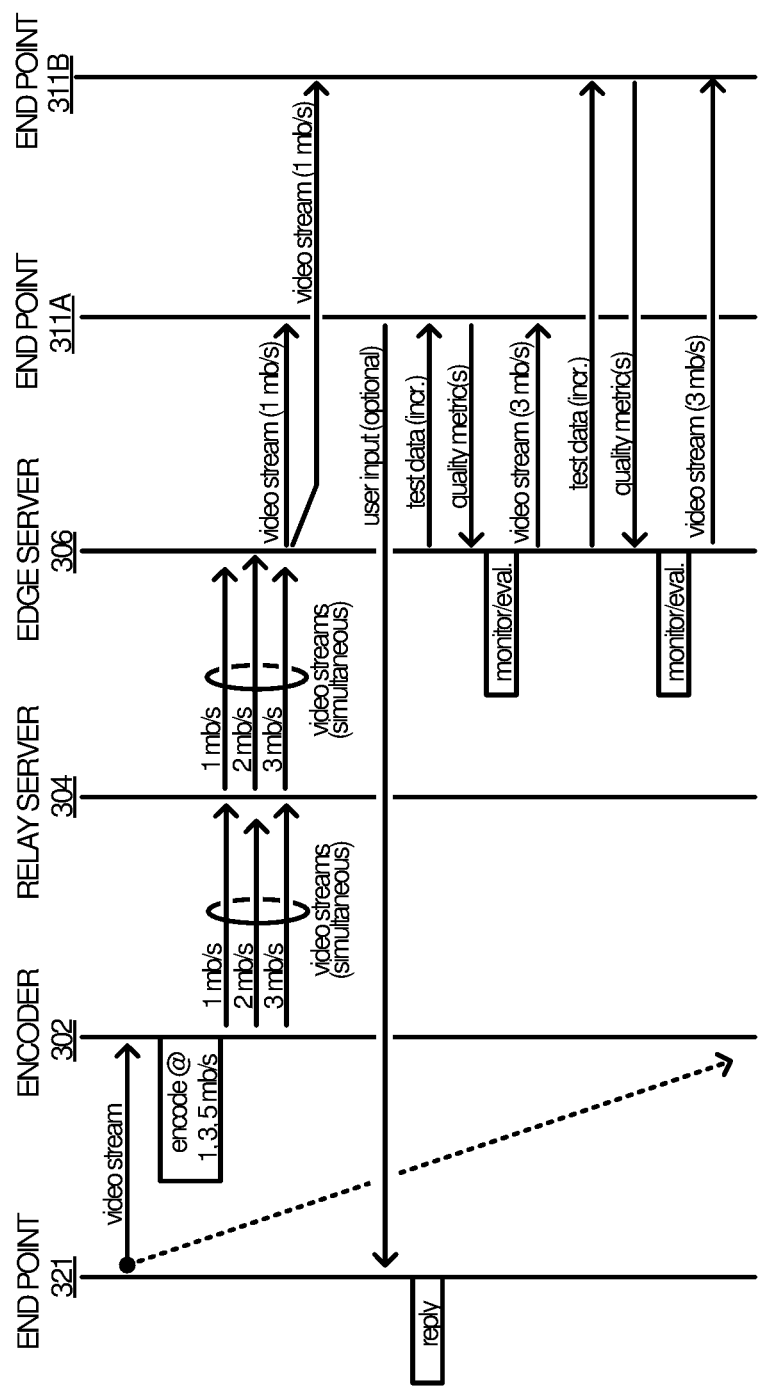
FIG. 4 illustrates an operational scenario in an implementation.

FIG. 4 illustrates an operational scenario in an implementation with respect to operational environment 300 in FIG. 3. In operation, end point 321 streams video of a local experience to encoder 302. The local experience may be, for example, a gaming experience being play out on end point 321, a live video feed of a scene captured by end point 321 or a peripheral device, a video conference, or any other content that may be captured in video.

Assuming that end point 321 had encoded the video, encoder 302 proceeds to decode the video and then re-encode it at multiple bit rates. Encoder 302 sends the multiple versions of the video to relay server 304, which then relays the video one or more edge servers, including edge server 306 in this example scenario.

Edge server 306 streams out the video at one of the bit rates to end point 311A and also streams out the video at the same or a different bit rate to end point 311B. It is assumed for exemplary purposes that the video is streamed out at 1 mb/s initially. End points 311A and 311B receive their respective video streams and play them out to their users. One or more of the users may optionally engage with a user associated with end point 321 by way of user input, e.g. chat messages, which may be exchanged with end point 321 either directly or indirectly in furtherance of the gaming, social network, or other such experience.

Edge server 306 employs streaming process 200 to gauge the robustness of the network link(s) between it and the end points, so as to increase the bit rate of the respective video streams, if feasible. In furtherance of this goal, edge server 306 sends test data to end point 311A in increasing increments. End point 311A measures the performance of the video stream as the test data is received and provides feedback to edge server 306. The feedback may indicate, for example, the latency of the video, packet loss, and/or jitter. Other metrics in place of—or in addition to—those metrics may also be included in the feedback, such as an indication of key frame loss, perceptual quality of the video, and the like.

Edge server 306 receives the feedback and determines whether a quality of the video stream satisfies a quality measure. The quality measure may be related to any one or more of the performance metrics in the feedback. For example, the quality measure may be a minimum acceptable amount of latency, packet loss, or jitter, or a composite value derived from any two or more of the metrics. The test data is incremented after each set of feedback is received until the quality fails to satisfy the minimums or until the present bit rate and the test bit rate together reach the next available bit rate. It is assumed for exemplary purposes that the next available bit rate is reached and thus the 3 mb/s video feed is streamed to end point 311A.

The same process is carried out by edge server 306 with respect to end point 311B. The process may occur with respect to end point 311B at substantially the same time as with end point 311A, even though they are shown as happening sequentially in FIG. 4.

Edge server 306 edge server 306 sends test data to end point 311B in increasing increments. End point 311B measures the performance of the video stream as the test data is received and provides feedback to edge server 306. Edge server 306 receives the feedback and determines whether a quality of the video stream satisfies a quality measure. The test data is incremented after each set of feedback is received until the quality fails to satisfy the minimums or until the present bit rate and the test bit rate together reach the next available bit rate. It is assumed for exemplary purposes that the next available bit rate is reached and thus the 3 mb/s video feed is streamed to end point 311B.

Edge server 306 may continue to employ streaming process 200 with respect to one or both of end point 311A and 311B since the 5 mb/s bit rate version of the video remains. Thus, edge server 306 may continue to send test data at incrementally increased rates, receive feedback, and switch to the 5 mb/s feed if allowed based on the quality response of the 3 mb/s video feed to the increasing amounts of test data.

Figure 5:
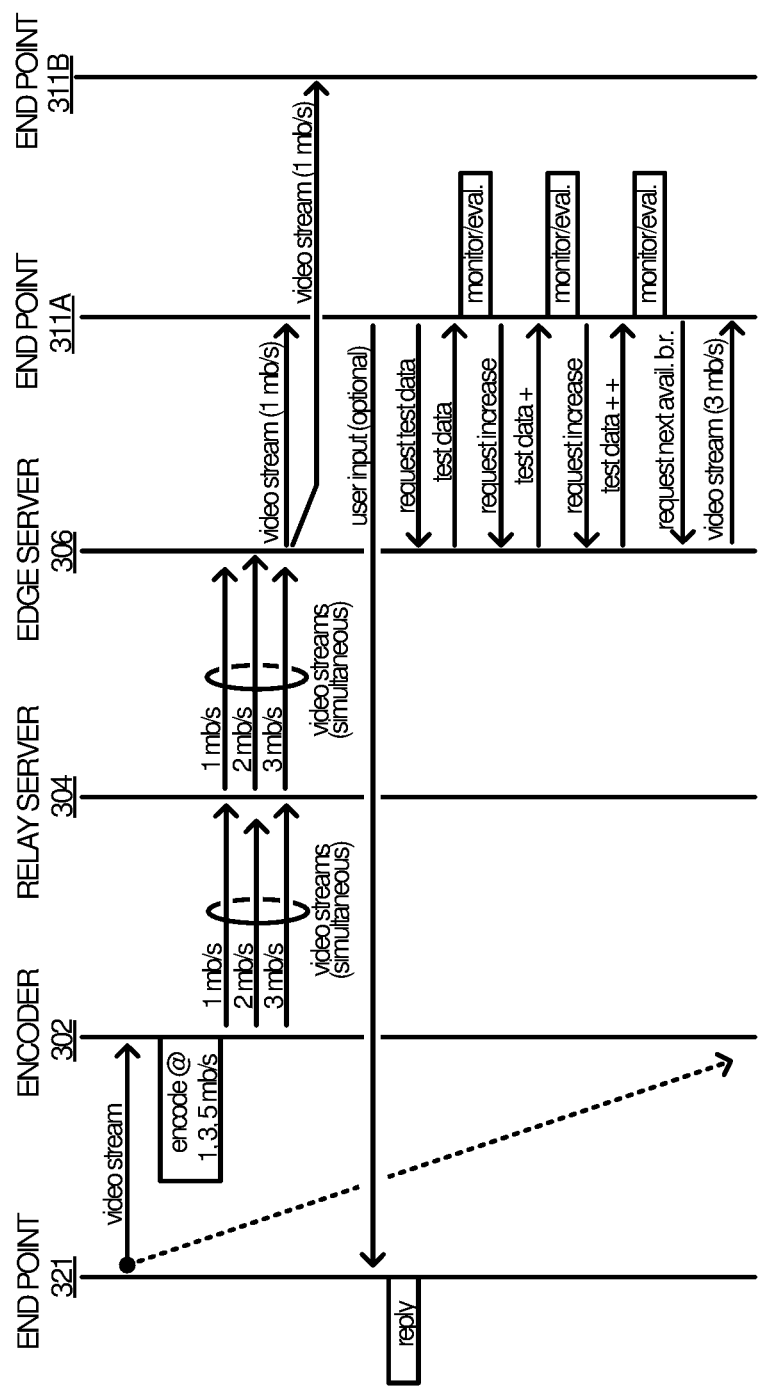
FIG. 5 illustrates an operational scenario in an implementation.

FIG. 5 illustrates the same scenario as FIG. 4, but with end point 311A making the determination whether to upgrade to a higher bit rate video feed. In operation, end point 321 streams video of a local experience to encoder 302. The local experience may be, for example, a gaming experience being play out on end point 321, a live video feed of a scene captured by end point 321 or a peripheral device, a video conference, or any other content that may be captured in video.

Encoder 302 proceeds to decode the video and then re-encode it at multiple bit rates. Encoder 302 sends the multiple versions of the video to relay server 304, which then relays the video one or more edge servers, including edge server 306 in this example scenario.

Edge server 306 streams out the video at one of the bit rates to end point 311A and also streams out the video at the same or a different bit rate to end point 311B. It is assumed for exemplary purposes that the video is streamed out at 1 mb/s initially. End points 311A and 311B receive their respective video streams and play them out to their users. One or more of the users may optionally engage with a user associated with end point 321 by way of user input, e.g. chat messages, which may be exchanged with end point 321 either directly or indirectly in furtherance of the gaming, social network, or other such experience.

End point 311A next requests test data from edge server 306. Alternatively, edge server 306 may be programmed to automatically and/or periodically send test data to end point 311A. End point 311A receives the test data and evaluates the quality response of the initial video feed to the test data. If the quality of the video feed remains satisfactory, end point 311A sends a request to edge server 306 to increase the bit rate of the test data.

Edge server 306 complies with the request and sends an increased amount of test data to end point 311A. End point 311A again receives the test data and evaluates the quality response of the initial video feed. It is assumed that the quality remains high and so end point 311A again requests an incremental increase in the test data.

Edge server 306 sends more test data at a further-increased bit rate. End point 311A receives the increased test data and, in response to the quality of the video feed continuing to remain satisfactory, requests edge server 306 to switch to the next available bit rate. Accordingly, edge server 306 sends the 3 mb/s version of the video to end point 311A.

It may be appreciated that end point 311A could continue with such a process since the 5 mb/s version of the video remains. In addition, end point 311B could also employ the same process locally with respect to the video feed it receives.

Figure 6:
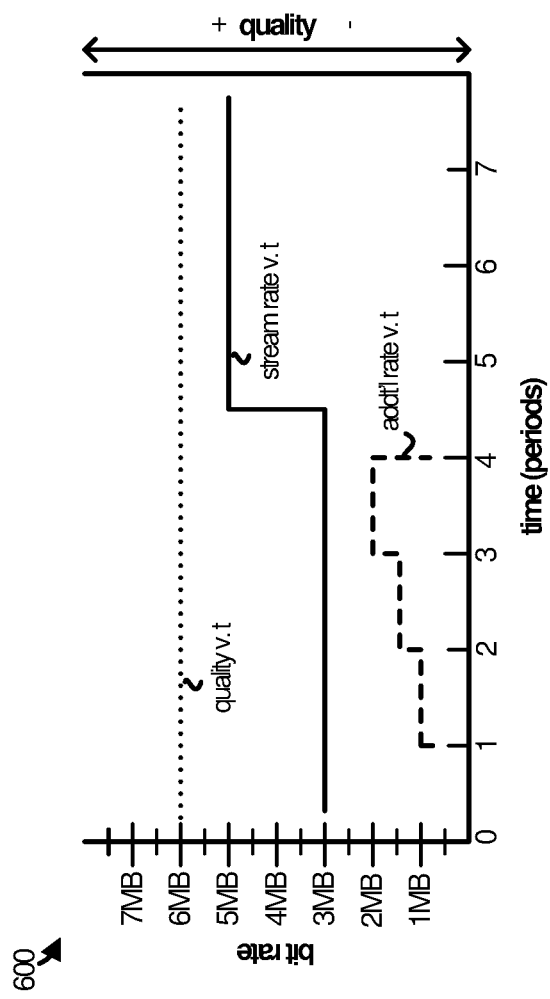
FIG. 6 illustrates a visualization of a scenario in an implementation.
Figure 7:
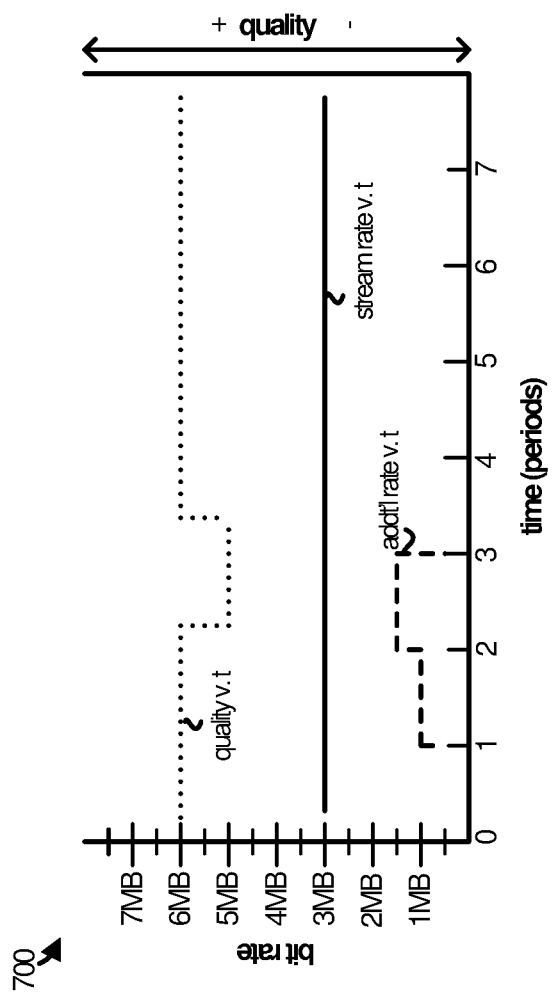
FIG. 7 illustrates a visualization of a scenario in an implementation.
Figure 8:
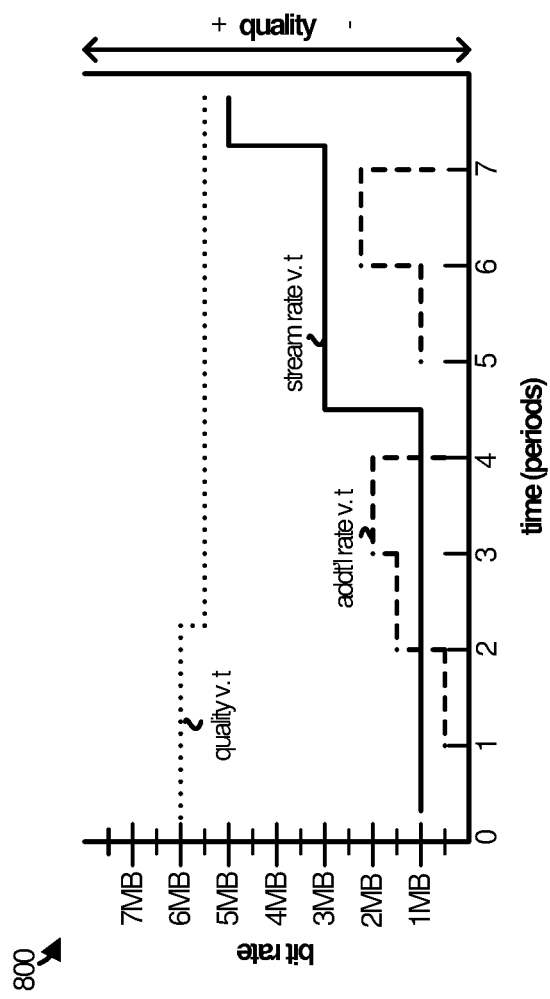
FIG. 8 illustrates a visualization of a scenario in an implementation.

FIGS. 6-8 illustrate various operational scenarios to better explain some aspects of the video streaming technology disclosed herein. In FIG. 6, graph 600 includes two y-axes (bit rate and quality) graphed against the x-axis (time). On the left y-axis, the encoded bit rate of a video stream sent from an encoder to an end point in operational environment 300 is illustrated. On the right y-axis, the quality of the video stream is illustrated in terms of an increase in quality and a decrease in quality. Finally, three lines are graphed: the bit rate of the main video stream; the bit rate of the test data being sent; and the relative quality of the main video stream (which indicates if the quality is increasing, decreasing, or remains the same).

As shown, the bit rate of the video stream is initially 3 mb/s and its quality is considered high. As time progresses, test data is introduced at 1 mb/s. The edge server streaming the video and sending the data monitors how the quality of the stream reacts to the test data. Here, the quality is maintained and so the edge server totals the additional bit rate and the present bit rate of the stream. Since the sum is 4 mb/s, which is less than the next available bit rate (5 mb/s), the edge server increments the bit rate of the test data to 1½ mb/s in this example, although the increments may be smaller or larger.

Once the test data is increased, the edge server gauges the quality response to the added traffic. Here, the quality remains strong. In addition, the sum of the additional bit rate and the present bit rate is still less than the next available bit rate. Accordingly, the edge server increments the additional bit rate to 2 mb/s. At this point, the quality still has not declined and, since the additional bit rate plus the present bit rate equals the next available bit rate (5 mb/s), the edge server switches the stream to the version encoded at 5 mb/s. The higher bit rate video is thus streamed to the end point for the duration or optionally until its quality declines to a point that triggers a step down to a lesser bit rate.

In FIG. 7, graph 700 includes the same x and y axes. The bit rate of the video stream is initially 3 mb/s and its quality is high. As time progresses, test data is introduced at 1 mb/s. The edge server streaming the video and sending the data monitors how the quality of the stream reacts to the test data. In this example, the quality is maintained and so the edge server sums the additional bit rate and the present bit rate of the stream. Since the sum is 4 mb/s, which is less than the next available bit rate (5 mb/s), the edge server increments the bit rate of the test data to 1½ mb/s in this example, although the increments may be smaller or larger.

Having increased the test data, the edge server monitors the quality of the video stream to the increase. It is assumed for exemplary purposes that the quality declines beyond a threshold amount. The quality decline indicates that a higher bit rate cannot be supported. The test data is stopped, and the video stream is maintained at its initial bit rate for the duration or optionally until another decline in quality precipitates a step down in its bit rate. The test data may be re-introduced again at a later time to gauge the ability of the network(s) connecting the edge server to the end point to support a higher bit rate.

Graph 800 in FIG. 8 also contains the same x and y axes for time, bit rate, and quality as in FIGS. 6-7. In operation, an edge server transmits a video stream at a first bit rate (1 mb/s) to an end point. The edge server proceeds to send test data at 0.5 mb/s to the end point while monitoring the quality of the original video stream. As no decline occurs in the quality, and since the sum of the initial bit rate and the additional bit rate (1.5 mb/s) does not reach the next available bit rate (3 mb/s), the edge server steps up the test data.

As the test data increases to 1.5 mb/s, the quality of the original video signal declines. However, the decline is not sufficient enough to stop the incremental increases to the test data. Rather, the quality is judged to be acceptable. Accordingly, the bit rate of the test data is increased again to 2 mb/s, bringing the total bit rate to 3 mb/s.

At this point, the sum of the bit rates has reached the next available bit rate and the edge server responsively switches the stream to the 3 mb/s feed. The edge server also continues to send test data to ascertain whether the end point and/or the network links therebetween can accommodate the next available bit rate of 5 mb/s. It is assumed for exemplary purposes that the quality remains satisfactory as the additional bit rate is increased from 1 mb/s to 2 mb/s, at which point the edge server switches the video stream to the data encoded at 5 mb/s.

FIG. 9 illustrates computing system 901, which is representative of any system or collection of systems in which the various applications, services, scenarios, and processes disclosed herein may be implemented. Examples of computing system 901 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes streaming process 906, which is representative of the processes discussed with respect to the preceding FIGS. 1-8, including streaming process 200. When executed by processing system 902 to enhance video streaming, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing streaming process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or other application software, in addition to or that include streaming process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to stream video. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method of operating a streaming service, the method comprising:
   in an encoder:
      receiving video data encoded at an initial bit rate by a source of the video data, wherein the source comprises an end point that streams the video data live to other endpoints;
      re-encoding the video data at a plurality of bit rates that include the initial bit rate and bit rates lower than the initial bit rate; and
      sending the video data at the plurality of bit rates simultaneously to a relay server;
   in the relay server, sending the video data at the plurality of bit rates simultaneously to an edge server; and
   in the edge server:
      streaming the video data at a given bit rate to a first end point of the other end points, wherein the given bit rate comprises one of the bit rates;
      sending test data to the first end point at an additional bit rate while streaming the video data at the given bit rate;
      increasing the additional bit rate of the test data by two or more increments until a total bit rate of the video data and the test data reaches a next available bit rate of the bit rates, or until a quality of the video data fails to satisfy a quality measure;
      conditionally switching from streaming the video data to the first end point at the given bit rate to streaming the video data at the next available bit rate when the total bit rate reaches the next available bit rate; and
      continuing to stream the video data to the first end point at the given bit rate when
   the quality of the video data fails to satisfy the quality measure at any of the two or more increments.

2. The method of claim 1 wherein the test data comprises a duplicate of at least a portion of the video data, wherein the quality of the video data is defined in terms of one or more performance metrics associated with the streaming of the video data, and wherein the method further comprises:
   if the quality fails to satisfy the quality measure, refraining from sending any more of the test data.

3. The method of claim 1 wherein re-encoding the video data at a plurality of bit rates comprises generating multiple versions of the video data, wherein each of the multiple versions of the video data is encoded at a different bit rate relative to each other of the multiple versions of the video data.

4. The method of claim 3 wherein streaming the video data at the next available bit rate comprises streaming a different one of the multiple versions of the video data that was encoded at the next available bit rate.

5. The method of claim 4 wherein the one or more performance metrics associated with the streaming of the video data comprise latency, jitter, and packet loss.

6. The method of claim 1 further comprising switching from streaming the video data at the given bit rate to streaming the video data at a lower bit rate in response to a decline in the quality irrespective of the sending of the test data.

7. The method of claim 1 wherein streaming the video data at the given bit rate and at the next available bit rate comprises streaming the video data in accordance with a connectionless and unreliable transport protocol.

8. The method of claim 1 wherein the video data comprises video captured of a gaming session by an originating end point for broadcast to the other end points.

9. A system for streaming video, the system comprising:
an encoder configured to:
receive video data encoded at an initial bit rate by a source of the video data, wherein the source comprises an end point that streams the video data live to other endpoints;
re-encode the video data at a plurality of bit rates that include the initial bit rate and bit rates lower than the initial bit rate; and
send the video data at the plurality of bit rates simultaneously to a relay server;
the relay server configured to: send the video data at the plurality of bit rates simultaneously to an edge server; and
the edge server configured to:
stream the video data at a given bit rate to a first end point of the other endpoints, wherein the given bit rate comprises one of the bit rates;
send test data, comprising a duplicate of at least a portion of the video data, to the first end point at an additional bit rate while streaming the video data at the given bit rate;
increase the additional bit rate of the test data by two or more increments until a total bit rate of the video data and the test data reaches a next available bit rate of the bit rates, or until a quality of the video data fails to satisfy a quality measure; and
conditionally switch from streaming the video data to the end point at the
given bit rate to streaming the video data at the next available bit rate when the total bit rate reaches the next available bit rate; and
continue to stream the video data to the first end point at the given bit rate when the quality of the video data fails to satisfy the quality measure at any of the two or more increments.

10. The system of claim 9 wherein edge server is further configured to:
if the quality fails to satisfy the quality measure, refrain from sending any more of the test data.

11. The system of claim 9 wherein to re-encode the video data at a plurality of bit rates, the encoder is further configured to generate multiple versions of the video data, wherein each of the multiple versions of the video data is encoded at a different bit rate relative to each other of the multiple versions of the video data.

12. The system of claim 11 wherein to stream the video data at the next available bit rate, the edge server is further configured to stream a different one of the multiple versions of the video data that was encoded at the next available bit rate.

13. The system of claim 9 wherein the edge server is further configured to switch from streaming the video data at the given bit rate to streaming the video data at a lower bit rate in response to a decline in the quality irrespective of the sending of the test data.

14. The system of claim 9 wherein the edge server is further configured to stream the video data in accordance with a connectionless and unreliable transport protocol.

15. The system of claim 9 wherein the quality of the video data is defined in terms of one or more performance metrics associated with the streaming of the video data, and wherein the one or more performance metrics comprise latency, jitter, and packet loss.

16. A computing apparatus comprising:
one or more computer readable storage media;
a processing system operatively coupled to the one or more computer readable storage media; and
program instructions stored on the one or more computer readable storage media for operating an edge server, wherein the program instructions, when executed by the processing system, direct the computing apparatus to at least:
receive, simultaneously from a relay server, a stream of video data at a plurality of bit rates that includes an initial bit rate encoded at a source of the video data, and bit rates re-encoded by an encoder from the initial bit rate at bit rates lower than the initial bit rate, wherein the encoder received the video data at the initial bit rate from the source of the video and sent the video data at the plurality of bit rates simultaneously to the relay server;
stream the video data at a given bit rate to a first end point of the other end points, wherein the given bit rate comprises one of the bit rates;
send test data, comprising a duplicate of at least a portion of the video data, to the first end point at an additional bit rate while streaming the video data at the given bit rate;
increase the additional bit rate of the test data by two or more increments until a total bit rate of the video data and the test data reaches a next available bit rate of the bit rates, or until a quality of the video data fails to satisfy a quality measure;
conditionally switch from streaming the video data to the first end point at the given bit rate to streaming the video data at the next available bit rate when the total bit rate reaches the next available bit rate; and
continue to stream the video data to the first end point at the given bit rate when the quality of the video data fails to satisfy the quality measure at any of the two or more increments.

17. The computing apparatus of claim 16 wherein to monitor for the threshold decline in the quality of the video data, the program instructions direct the computing apparatus to monitor one or more performance metrics associated with the stream of the video data at the given bit rate.

18. The computing apparatus of claim 17 wherein the one or more performance metrics associated with the stream of the video data at the given bit rate comprise latency, jitter, and packet loss.

19. The computing apparatus of claim 16 wherein the program instructions direct the computing apparatus to switch from streaming the video data at the given bit rate to streaming the video data at a lower bit rate in response to a decline in the quality.

20. The computing apparatus of claim 16 wherein the video data comprises video captured of a gaming session by an originating end point.

* * * * *